(12) United States Patent
Bogrett

(10) Patent No.: US 9,330,140 B1
(45) Date of Patent: May 3, 2016

(54) TRANSIENT VIRTUAL SINGLE TENANT QUERIES IN A MULTI-TENANT SHARED DATABASE SYSTEM

(71) Applicant: Xactly Corporation, San Jose, CA (US)

(72) Inventor: Steven Ward Bogrett, Los Gatos, CA (US)

(73) Assignee: XACTLY CORPORATION, San Jose, CA (US)

( * ) Notice: Subject to any disclaimer, the term of this patent is extended or adjusted under 35 U.S.C. 154(b) by 0 days.

(21) Appl. No.: 14/799,210

(22) Filed: Jul. 14, 2015

(51) Int. Cl.
*G06F 17/30* (2006.01)
(52) U.S. Cl.
CPC .... *G06F 17/30448* (2013.01); *G06F 17/30498* (2013.01); *G06F 17/30958* (2013.01)
(58) Field of Classification Search
USPC ................................................ 707/713, 759
See application file for complete search history.

(56) References Cited

U.S. PATENT DOCUMENTS

| | | | |
|---|---|---|---|
| 6,460,027 B1 * | 10/2002 | Cochrane | G06F 17/30457 |
| 6,574,623 B1 * | 6/2003 | Leung | G06F 17/30454 |
| 7,103,613 B2 * | 9/2006 | Nouri | G06F 17/30513 |
| 7,426,522 B2 * | 9/2008 | Nouri | G06F 17/30607 |
| 7,587,383 B2 * | 9/2009 | Koo | G06F 17/30454 |
| 8,095,531 B2 * | 1/2012 | Weissman | G06F 21/6227 707/713 |
| 8,156,134 B2 * | 4/2012 | Sun | G06F 17/30427 707/706 |
| 8,417,709 B2 * | 4/2013 | Chiticariu | G06F 17/30616 705/7.11 |
| 8,478,743 B2 * | 7/2013 | Chandramouli | G06F 17/30463 707/718 |
| 2006/0277341 A1 * | 12/2006 | Johnson | G06F 21/6227 710/200 |

\* cited by examiner

*Primary Examiner* — Kim Nguyen
(74) *Attorney, Agent, or Firm* — Hickman Palermo Becker Bingham LLP

(57) ABSTRACT

A data processing method comprising using an application server computer, establishing a shared multi-tenant system in which tenant data that is associated with tenants is stored together in a real shared data store system; providing to a tenant computing device identifiers that identify virtual objects, wherein each of the virtual objects represents a data entity that is stored in the real shared data store system; receiving a SQL query from the tenant computing device that specifies a data operation on a first virtual object of the virtual objects; rewriting the SQL query by dynamically replacing the first virtual object with an identifier of a function; executing the function and the rewritten query without explicit metadata to generate a result set; sending the result set to the tenant computing device.

14 Claims, 7 Drawing Sheets

TRANSIENT VIRTUAL SINGLE TENANT QUERIES IN A MULTI-TENANT SHARED DATABASE SYSTEM

TECHNICAL FIELD

The present disclosure generally relates to managing access to data in a multitenant system. The disclosure relates more specifically to techniques for providing an individual tenant with a greater degree of access to their data in a multitenant system at the Structured Query Language (SQL) level.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Increases in hardware and on-premises software support costs has given way to a new technology delivery model in which an application service provider hosts applications coupled to data storage units on networked devices that are owned by the application service provider. Using "software as a service" or SaaS, the application service provider's customers, typically business enterprises, connect to the hosted applications via a web browser and enter data via the applications with the expectation that the data entered will be available on-demand whenever needed. The customers typically access the data for various data mining or data aggregation operations required to perform various analytics, such as determining particular trends related to their enterprise's operations. A practical example is analysis of the compensation that is due to employees of an enterprise that uses an incentive compensation plan in which compensation is tied to sales, quotas, products, services and customers, all of which may vary over time. Each different enterprise customer of the application service provider is considered a "tenant" having data that is commingled in a multi-tenant database system using a single shared database, yet subject to security controls that prevent one tenant from viewing or using the data of another tenant; the tenants may be competitors or simply require confidentiality of their data.

In such a system, the application service provider rarely has advanced notice of when a customer may request access to its data; therefore, data entered by customers must be available at all times. Consequently, the application service provider must ensure that data entered by customers is always recorded and stored, and that customers may access that data, on-demand, for later consumption.

Customer data is not always in a standardized format desired by the application service provider, however. The process of converting data from a customer-specific format into a different format, such as a format needed for a multi-tenant service, is generally referred to as Extract, Transform, and Load (ETL). ETL may result in the creation of temporary data and/or may store customer data in a variety of places. In many instances, the ETL process is a black box to customers—there is no insight available, and customers may not even be able to access their data until after the ETL process is completed.

However, managing access to customer data, both during ETL and after ETL is completed, is a challenging task. Application service providers are hesitant to give customers full access to their data in the production database, as they could potentially do great harm, such as accidental deletions, causing crashes, accidentally accessing or modifying another tenant's data, etc. Simultaneously, the customer expects to have access to their own data, even in an intermediate form, whenever they want.

Structured Query Language (SQL) has been used in past database systems as a way to express instructions to a computer-implemented database about what data to search for, retrieve and provide.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In the following description reference will be made to both data stores and databases. A data store is a repository for data. Similarly, a database is structured data store. A database may be structured in any suitable way, and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

In an embodiment, a method is described for managing access to data in a multitenant system. Specifically, virtual objects are identified and provided to a tenant device, such as in response to a request for a table list. "Tenant device," in this context, may be an end-user computing device associated with a user at an enterprise customer or other discrete tenant of the system.

In one specific embodiment, the techniques herein are implemented using a computer-implemented, multi-tenant shared system having a structured query language (SQL) engine for parsing queries from users or applications that are expressed using text, commands or programmatic functions in SQL syntax. When an SQL query is received from the tenant device to access a virtual object, the application server computer executes the SQL query without metadata by dynamically replacing the virtual object with a function. The function is executed to generate the desired result and, the result is sent to the tenant device.

In one embodiment, a tenant accesses the data store using a RESTful database connector. In one embodiment, functions include programming to implement federation.

In other embodiments, the invention encompasses a computer apparatus and/or a computer-readable medium configured to carry out the foregoing methods.

Example System Implementation

Figure 1A:
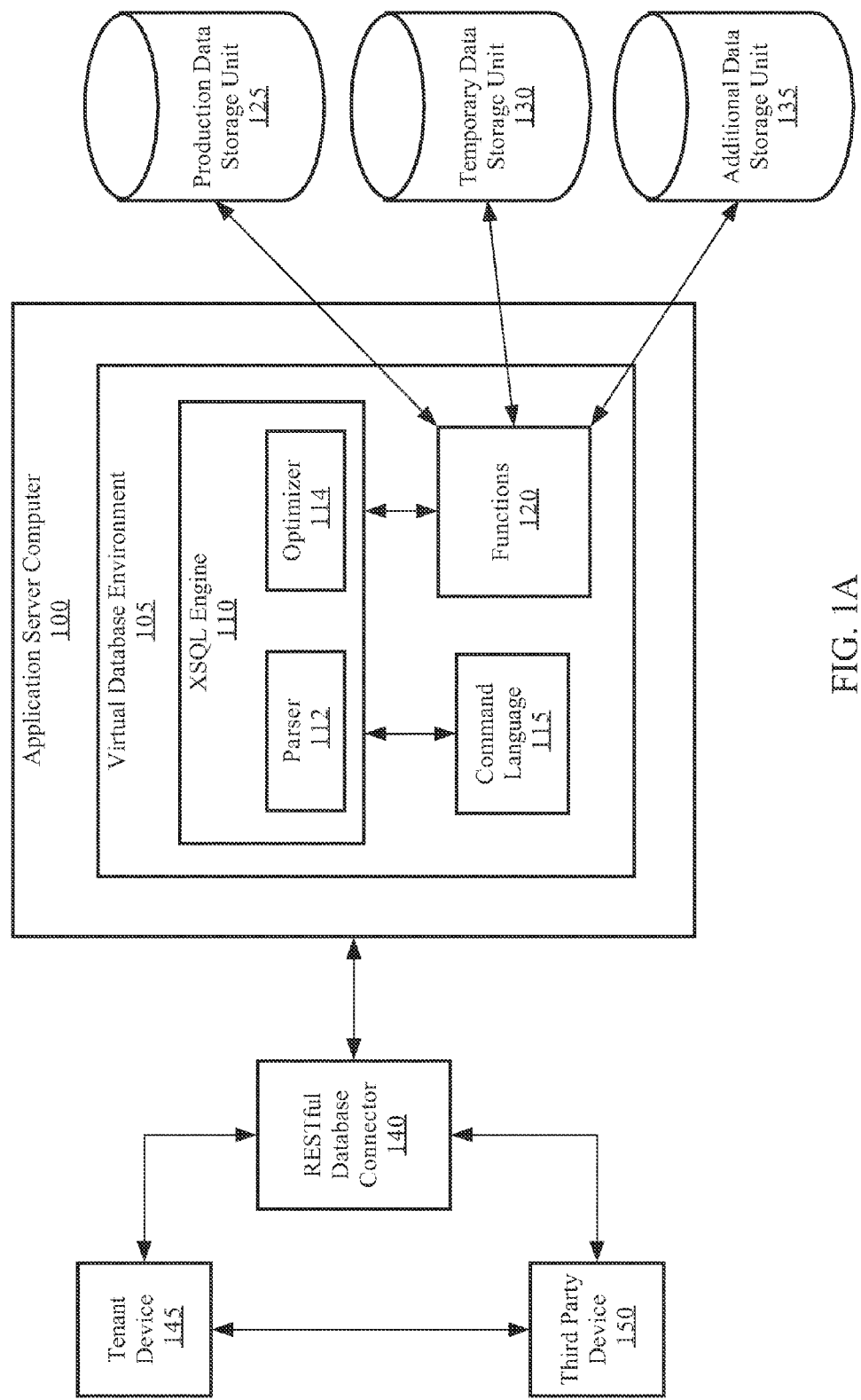
FIG. 1A shows a block diagram of a system in accordance with an embodiment of the invention.

FIG. 1A shows an example system in which the techniques described may be practiced, according to some embodiments. The system shown in FIG. 1A is a programmed, computer-based system. The various components of the system shown in FIG. 1A are implemented at least partially by hardware at one or more computing devices, such as one or more hardware processors executing instructions stored in one or more memories for performing various functions described herein. FIG. 1A illustrates only one of many possible arrangements of components configured to perform the functions and programmatic operations that are described herein. Other arrangements may include fewer or different components, and the division of work between the components may vary depending on the arrangement.

The system shown in FIG. 1A includes application server computer 100, virtual database environment 105, XSQL engine 110, parser 112, optimizer 114, command language 115, functions 120, production data storage unit 125, temporary data storage unit 130, additional data storage unit 135, RESTful database connector 140, tenant device 145, and third party device 150. Application server computer 100 is any computing device capable of executing one or more programs, procedures, modules, scripts, etc., in a multitenant environment. In one embodiment, application server computer 100 may execute and/or support a business application, such as Xactly Incent, commercially available from Xactly Corporation, San Jose, Calif.

Application server computer 100 is communicatively connected, using any wired and/or wireless connection, to tenant device 145 and/or third party device 150 (via RESTful database connector 140), production data storage unit 125, temporary data storage unit 130, and additional data storage unit 135. Application server computer 100 includes any programming and/or hardware as needed to implement the invention. Additionally, although application server computer 100 is depicted as a single device, application server computer 100 may include any number of devices in one or more locations. Specifically, application server computer 100 includes virtual database environment 105, XSQL engine 110, command language 115, and functions 120.

In one embodiment, virtual database environment 105 comprises computers and programs that provides tenants in a multitenant system with access to their data using SQL queries as if the data existed on a single-tenant system. In one embodiment, virtual database environment 105 includes programming to receive credential information from tenants, such as a login/password. The credential information is used to link the tenant with their private data, and ensure that the right data is provided to the right tenant. The credential information may comprise a username and password, multi-factor authentication, or other security credentials.

In one embodiment, virtual database environment 105 is programmed to perform logging of all actions taken by a tenant, for tracking purposes. For example, the virtual database environment 105 is programmed to identify any actions (e.g., joins, add columns, etc.) taken by functions 120 and to individually commit and/or update the multitenant system and/or production data storage unit 125, on a job by job basis. In one embodiment, any suitable component may determine whether to commit and/or update data based on tenant actions within virtual database environment 105, such as another application or module executing on application server computer 100 or other device, an administrator or other user, etc. Additionally, actions may be logged in any suitable manner.

In one embodiment, virtual database environment 105 includes programming to identify virtual objects to tenant devices. Virtual objects are not directly accessible by tenant devices, as they are placeholders created by virtual database environment 105 to provide a level of abstraction from the actual file. The virtual objects may represent, for example, a database, a table of a database, a file, etc. For example, a file is stored on a production database, prod. When a tenant requests to view accessible files, a virtual object, foo, may be returned to the tenant. However, foo merely resolves to prod when the tenant sends requests to the virtual database environment 105. In one embodiment, during execution of an SQL instruction containing the virtual object, the virtual object will be replaced by a function that resolves to the actual desired database, table, file, etc. This process is discussed in more detail, below.

In one embodiment, XSQL engine 110 comprises logic or programs that are programmed or configured to parse and execute queries that are received in SQL, and then transformed into a query syntax that is similar to conventional SQL but includes constructs permitting queries to execute without certain metadata and without performing certain conventional operations that are incompatible with a multi-tenant system. For example, XSQL engine 110 is programmed not to directly store or modify information in any table, database, or other data storage target. XSQL engine 110 includes programming to parse SQL queries and provide interfaces for interaction with functions 120. For purposes of conciseness and to clearly illustrate an example, the transformed syntax described herein is labeled "XSQL", but other labels or terms may be used in an embodiment. A query may be received from a calling program or tenant in ordinary SQL, and then is transformed automatically to XSQL for subsequent processing.

The received SQL query typically specifies a virtual object in the shared multi-tenant database, typically a table, and the query is received at the XSQL engine 110. As the XSQL engine 110 parses the SQL query, the virtual object specified in the SQL query is replaced in an XSQL expression with a function from among the functions 120, as indicated by command language 115. Thus, the XSQL engine 110 is programmed to dynamically replace virtual objects in queries at runtime with a function. Examples of functions are described further herein and one example is to substitute a function that limits the query only to data records that are tagged with a tenant identifier that corresponds to a tenant that issued the query.

Consequently, the XSQL engine 110, and the XSQL query, do not access data; instead, the functions that have been substituted into the query are called, and those functions perform any required data access. As a result, a user, user program, or system program can form an SQL-style query and specify a target object, but the XSQL engine 110 is programmed to act as an intermediary to govern whether the query actually is permitted to access or update the specified target object, and to automatically substitute program functions that can enforce tenant boundaries or other security requirements. Therefore, the user, user program, or system program can operate as if it has exclusive, single-tenant access to the database yet the XSQL engine 110 and other elements of the system of FIG. 1A can actually implement a multi-tenant system in a single shared database.

An added benefit of this approach is that XSQL engine 110 does not require programming that governs how the functions 120 access the data. However, the functions 120 and XSQL engine 110 may be programmed in a compatible manner. For example, in one embodiment, each of the functions 120 returns data in table form so that the XSQL engine 110 can pass the result set directly to the calling program. XSQL engine 110 may have additional requirements for functions 120.

In one embodiment, XSQL engine 110 is programmed with interfaces for interaction with functions 120 that address separation of responsibility, to enable the functions 120 to perform as much processing as possible. As an example, XSQL engine 110 may be programmed with an interface that defines actions available to functions 120 in SQL terms such as INSERT, DELETE, UPDATE, and SELECT. Functions 120 may comprise JAVA methods that selectively implement one or more of the interfaces. XSQL engine 110 includes programming to determine which interface(s), if any, a given function implements, and thus can determine whether the given function can perform the actions needed for a particular XSQL query. In one embodiment, when a function has not implemented an interface that is needed to process an XSQL query, the XSQL engine 110 includes programming to return an error to the requesting program or tenant. XSQL engine 110 may also provide a variety of other interfaces including, but not limited to: context (allowing functions to execute XSQL statements from within an execution unit), result (represents a set of data that may be traversed by a cursor), cursor, get row, get column, aggregate, scalar, etc.

In one embodiment, XSQL engine 110 includes programming to test or validate the data that is returned by a function. As an example, XSQL engine 110 may perform a post check on the data returned by a function, to ensure that the function correctly returned a result set that is valid for the SQL query that was received. For example, if a function implements the SELECT interface, then the function might be invoked to return data for the SQL query:

select * from foo where a=5

However, if the function returns data where a=5 and a=6, as a result of "best try" programming in the database engine, then XSQL engine 110 is programmed to detect that additional data has been returned. In one embodiment, XSQL engine 110 may discard the additional data, and return just the data specifically requested by the SQL query. Alternatively, XSQL engine 110 may inform the calling program or tenant that unwanted data was returned in the result set.

Figure 1B:
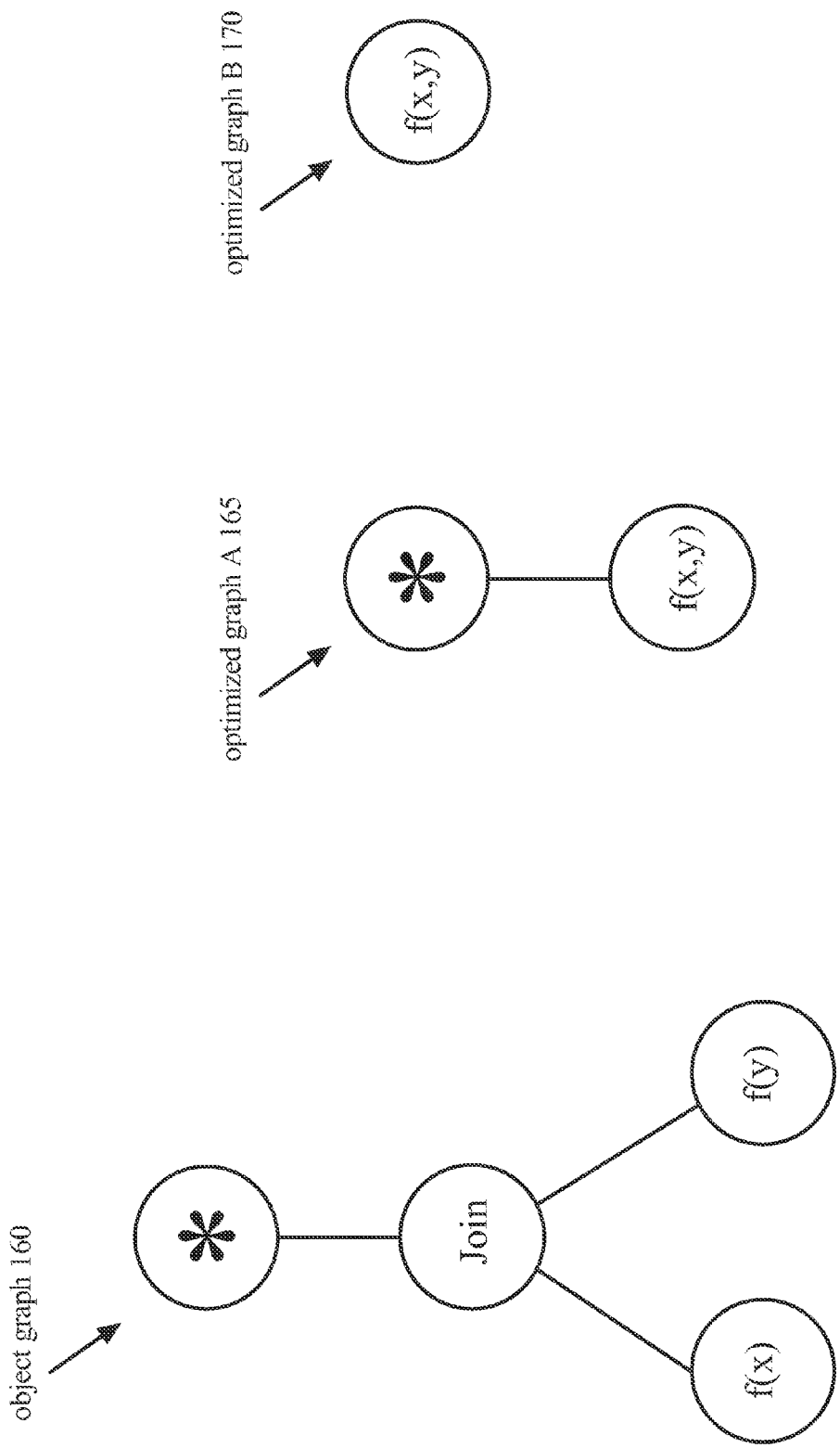
FIG. 1B shows examples of object graphs in accordance with an embodiment of the invention.

In one embodiment, XSQL engine 110 includes parser 112. Parser 112 transforms an XSQL query into an object graph. The object graph may contain any number of nodes, and may be organized in any suitable fashion. Each node of a graph generated by parser 112 may represent a java class, a function, a data structure, or any other suitable element. FIG. 1B shows an example object graph 160 that may be generated by a parser for the statement: select * from f(x) join f(y). For this example, function f returns all data in the associated table, database, or other suitable location. Thus, f(x) returns all data in "x." Functions are explained in further detail, below. As can be seen in object graph 160, after f(x) and f(y) return all data from "x" and "y," the results are joined, and all results are selected for returning to the requesting tenant and/or user. In one embodiment, the join may be performed by XSQL engine 110, or other suitable component.

In one embodiment, object graph 160 includes no metadata, and is able to execute without metadata. In other words, all information needed to execute object graph 160 is contained within the nodes of object graph 160, whether in classes, functions, etc. Further, object graph 160 may implement one or more interfaces of a data interface. The data interface includes select, insert, update, and delete.

Returning to FIG. 1A, in one embodiment, the graph generated by parser 112 is predictable, based on the commands contained in the query used to generate the graph, and is not optimized. In other words, the output of parser 112 may be improved to result in a shorter, more efficient graph that reduces the amount of time and effort required to generate a response to the query associated with the graph. In particular, through the optimization process, processing that would otherwise have been performed by XSQL engine 110 may be offloaded onto other computing devices, such as a server or database where data needed for the query is located.

In one embodiment, XSQL engine 110 includes optimizer 114. Optimizer 114 takes as input the graph generated by parser 112, and generates a second, optimized graph. In some instances, optimizer 114 may be unable to improve upon the output of parser 112, and no changes or improvements will be made to the graph generated by parser 112. However, optimizer 114 is frequently able to improve on the graph generated by parser 112. Optimizer 114 may process the graph generated by parser 112 in a variety of ways. Specifically, optimizer 114 may iterate through a graph using a visitor path, treat each node as though the node(s) contained data, and check if there are improvements that can be made. Any improvements made may, for example, reduce the size of the graph, improve the efficiency of the graph, or improve any other aspect of the graph (and thus the execution of the query). Optionally, optimizer 114 may take as input an optimized graph to check if there are further possible optimizations.

In one embodiment, optimizer 114 may instruct the nodes of the graph to optimize themselves. This self-optimization may be based on whether or not a given class and/or function implements a given interface (e.g., a function that performs a select may also implement a join, etc.), and/or whether the given class and/or function is able to perform additional steps or functionality. Further, when instructing a node to optimize, the optimization may be for a specific instruction or instructions. For example, optimizer 114 may instruct a node or nodes to optimize for select, predicate, join, aggregate, and/or sort. Alternatively, other optimizations may be performed. When optimizer 114 asks a node to optimize itself, if the node is able to optimize, the node returns another node or nodes. Specifically, the node may return a new instance of itself with additional data, a new class, a new node, a new function, etc. If a node or nodes is unable to optimize, then no new node is returned, and the process proceeds to another node, or may end as the graph may be optimized. When a node is asked to optimize itself, the node may optionally optimize any child nodes, if applicable. In one embodiment, the top node of the graph may be asked to optimize itself. Optionally, the top node may then request that a child node optimize itself, until a node is reached where an optimization may be performed. Alternatively, the optimization may be performed in any other suitable manner.

FIG. 1B also shows an example of an optimization of object graph 160, in optimized graph A 165. Specifically, optimized graph A 165 is the result of the object graph 160 optimizing for select. Both children of the join node are the function f, and thus function f is asked if function f may return the data from "x," immediately followed by the data from "y," which would effectively replace the join. In this example, function f is able to perform this functionality, and thus the returned node is f(x,y), which then replaces the join node, resulting in optimized graph A 165. In other words, rather than receiving the data from f(x) followed by the data from f(y), and subsequently using the "standard" join of XSQL to combine the two results, now function f will simply pull the data from "x" followed by the data from "y" and return both together, thereby negating the need for a join. Further optimizations may be available, as shown in optimized graph B 170. Specifically, since the function f(x,y) returns all data from "x" and "y," the * is unnecessary. Thus, again a new node is returned, and the object graph becomes one single node: f(x,y). Optimized graph B 170 is now fully optimized and all extraneous steps have been removed.

Returning to FIG. 1A, in one embodiment, the way in which optimizer 114 performs optimization enables the decision point for which optimizations to perform to be moved from XSQL engine 110, to the functions 120. In other words, instead of XSQL engine 110 having to know how to optimize graphs for many different instructions and resources, the functions used to perform the instructions and/or access the resources determine whether optimization is to be performed. The moving of this decision point results in a much simpler optimizer 114 than would be expected, and also results in pushing as much processing as possible to the functions, and thus away from the device or devices that execute XSQL engine 110.

In one embodiment, the command language 115 is a text based command language processor that includes programming to transform SQL queries, such as those used by XSQL engine 110, into XSQL queries that include references to or invocations of functions 120. In one embodiment, command language 115 dynamically places calls to functions 120 into in-memory representations of received SQL queries, after the SQL queries have been parsed and transformed into tokens or other data representation in memory.

In one embodiment the functions 120 may be created by any entity, including but not limited to the tenants and application service provider. In other words, there is no requirement that functions 120 are defined only by the ASP. In one embodiment, one or more functions 120 may be created by the entity that owns or operates application server computer 100. Alternatively, or in addition, one or more functions 120 may be created by one or more customers, such as a user of tenant device 145. Functions 120 may be defined using a source code programming environment using a language such as JAVA, C, C++, etc. Specifically, functions 120 are programmed to access one or more data sources.

In one embodiment, functions 120 may perform any type of action related to data including, but not limited to: joining, selection, filtering, aggregating, post-aggregation filtering, distinction, limits, and/or any combination of these actions. In some embodiments, functions 120 are programmed to write, or otherwise modify, data as requested by a tenant only in a non-production database, and the tenant or calling program may be uninformed about where the data is actually stored and/or written. This approach permits causing any changes to be reviewed or approved before updating the production database; in various embodiments, updates may be copies to an approval workflow for manual review by analysts under control of a workflow processing engine, or processed using review rules or approval rules under program control such as using regular expressions.

In one embodiment, functions 120 may include programming for reading only without write capability. Functions 120 may include inheritance, may reference additional classes, have helper functions, and/or have any other aspect or feature typical of functions. There may be any number of functions 120 and the architecture of FIG. 1A allows implementing dozens to thousands of functions subject only to storage or CPU constraints. Functions 120 may execute without the broader system, such as XSQL engine 110, being aware of how the execution is being performed. Rather, functions 120 need only return data in an array, or other useable form, and no additional information is needed or expected by the broader system.

In one embodiment, functions 120 need not strictly access databases or other data stores. Rather, functions 120 may access data from any source, such as the Internet. In one embodiment, regardless of the type of action a given function performs, any data returned by the function is returned in table form. Alternatively, data returned by functions 120 may take any form. In one embodiment, functions 120 in conjunction with XSQL engine 110, include programming to dynamically rewrite the functions. For example, if an XSQL query specifies
    JOIN f(x) f(y)
then the functions X and Y and XSQL engine 110 may dynamically rewrite the query to specify
    JOIN f(z)
when function f has been programmed to internally process a join of X and Y.

In one embodiment, one or more of the functions 120 is programmed to determine what action(s) or work they can perform by implementing one or more federation interfaces. Federation, in this context, refers to the interoperation of otherwise distinct systems, such as multiple different databases or database server computers. Examples of federation interfaces that may be used in an embodiment include:
    Selection
        select * from foo
        select A from foo
    Join
        select A, B from foo join bar
    Filtering
        select * from foo where a=5
    Aggregation
        select sum(A) from foo
    Post-aggregation filtering
        select A, B from foo group by * having sum(C)>5000
    Distinction
        select distinct A from foo
    Limits
        select * from foo limit 5

In one embodiment, one federation interface implements SELECT queries. Examples of federated SELECT queries include:
    select * from foo and
    select A from foo
    An example federated JOIN query is:
    select * from foo join bar
    An example federated filtering query is:
    select * from foo where a=5
    An example federated aggregation query is:
    select sum(A) from foo
    An example federated post aggregation filtering query is:
    select B, sum(A) from foo group by B having sum(A)>100
    An example federated distinction query is:
    select distinct A from foo
    An example federated limits query is:
    select * from foo limit 5

In one embodiment, functions 120 are programmed to federate different data storages. A function may federate to any number of different data storages. There may be multiple functions that federate to the same data store in different ways while coexisting within the application server computer 100. In one embodiment, when the data store accessed by one of the functions 120 can perform actions on its own, such as a database that is internally programmed to support selection, then the functions may permit the data store to perform the work. This approach may considerably reduce the load needed to be performed by application server computer 100 or other device(s). In particular, this feature may be taken advantage of during the optimization process when, for example, processing otherwise performed by XSQL engine 110 (e.g., join X, Y) may instead be performed by functions and their federated data stores (e.g., select X, Y).

In one embodiment, a function implementation can implement any or all of the available federation interfaces, and therefore can replace one or more portions of the query graph with a single function invocation depending on the implementation of the function. Specifically, the optimizer directs and manages the replacement of graph portions by the new graph nodes delivered by the function nodes that exist within the query graph at any moment before or during the optimization process.

Referring again to FIG. 1A, in one embodiment, production data storage unit 125 is any electronic digital data recording device that is configured to store data according to a set of rules and in any format, such as a flat file, a data store, a database, a data mart, a data warehouse or other storage units. In particular, production data storage unit 125 stores multi-tenant data of customers of an application service provider who owns and operates the system shown in FIG. 1A. Typically, tenants do not have direct write capability for production data storage unit 125. Rather, writes to production data storage unit 125 may be authorized once an application, administrator, or other suitable review of the action(s) has been performed. Alternatively, write access to production data storage unit 125 may be granted by one or more functions 120.

In one embodiment, temporary data storage unit 130 is any electronic digital data recording device configured to store data according to a set of rules and in any format, such as a flat file, a data store, a database, a data mart, a data warehouse or other storage units. In particular, temporary data storage unit 130 is used to store temporary data that is created by tenants or queries when using the virtual database environment 105. The temporary data may be created by actions of the tenant(s), such as during an ETL process, or during execution of SQL queries. Tenants may be granted read and write authority to temporary data storage unit 130 via functions 120. In one embodiment, data from temporary data storage unit 130 may be written to production data storage unit 125 once the changes and/or data is approved.

In one embodiment, additional data storage unit 135 is any electronic digital data recording device configured to store data according to a set of rules and in any format, such as a flat file, a data store, a database, a data mart, a data warehouse or other storage units. In particular, additional data storage unit 135 may store any type of data created by a tenant(s) or other entity, for any reason. Tenants may be granted read and/or write authority to additional data storage unit 135 via functions 120.

In one embodiment, RESTful database connector 140 is a database or data store connector implemented using Representational State Transfer (REST) standards. Specifically, Implementing the system of FIG. 1A using a database connector with REST offers improved performance for a multi-tenant system. Standard implementations of database connectors rely on Transmission Control Protocol (TCP) connections, which enable Atomicity, Consistency, Isolation, and Durability (ACID). ACID is deemed to be a critical aspect of database transactions as ACID ensures that the database transactions are processed reliably. In contrast, RESTful database connector 140 instead elects to use REST standards at the expense of some aspects of ACID. Specifically, RESTful database connector 140 uses Hypertext Transfer Protocol (HTTP) to connect with a database(s). HTTP and REST enables a load balancer (not shown) to optionally be used in conjunction with RESTful database connector 140. In one embodiment, full ACID compliance may be achieved even when using RESTful database connector 140.

In one embodiment, RESTful database connector 140 may be made RESTful in any suitable manner. Further, RESTful database connector 140 may be implemented using any type of database connector, such as Java Database Connectivity (JDBC), Open Database Connectivity (ODBC), and/or any other suitable database connector. Although shown as a separate entity in FIG. 1, RESTful database connector 140 may be located on any suitable device, such as application server computer 100, tenant device 145, third party device 150, or may be located on a separate device, as depicted in FIG. 1A.

In one embodiment, tenant device 145 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Tenant device 145 is communicatively connected to RESTful database connector 140 and third party device 150 using any suitable wired and or wireless technology. Tenant device 145 may include applications, software, and/or other executable instructions to facilitate various aspects of the invention described herein. Specifically, tenant device 145 is able to perform actions on data stored within the system of FIG. 1A using, for example, a web browser or other software application. Although only a single tenant device 145 is depicted, there may be any number of tenant devices 145, relating to any number of different tenants.

In one embodiment, third party device 150 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Third party device 150 may include applications, software, and/or other executable instructions to facilitate various aspects of embodiments. Specifically, third party device 150 is able to communicate with application server computer 100 using, for example, a web browser or other application, and perform actions on data stored within the system of FIG. 1A. In one embodiment, third party device 150 is used by a third party to perform ETL on the data of a tenant before the data is uploaded into the multitenant database.

Example Functional Implimentation

Figure 2A:
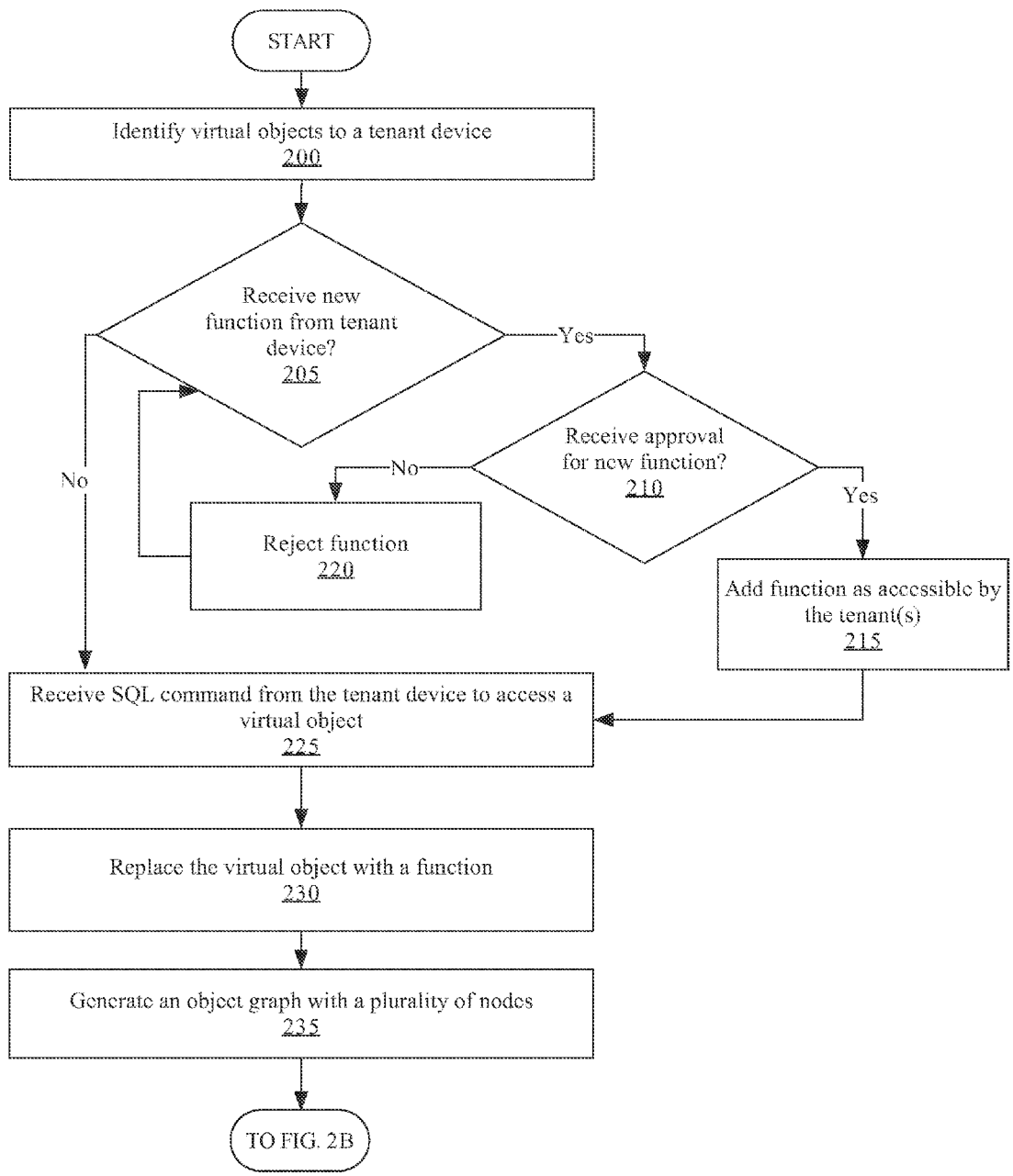
FIGS. 2A and 2B show flowcharts of a method in accordance with an embodiment of the invention.
Figure 2B:
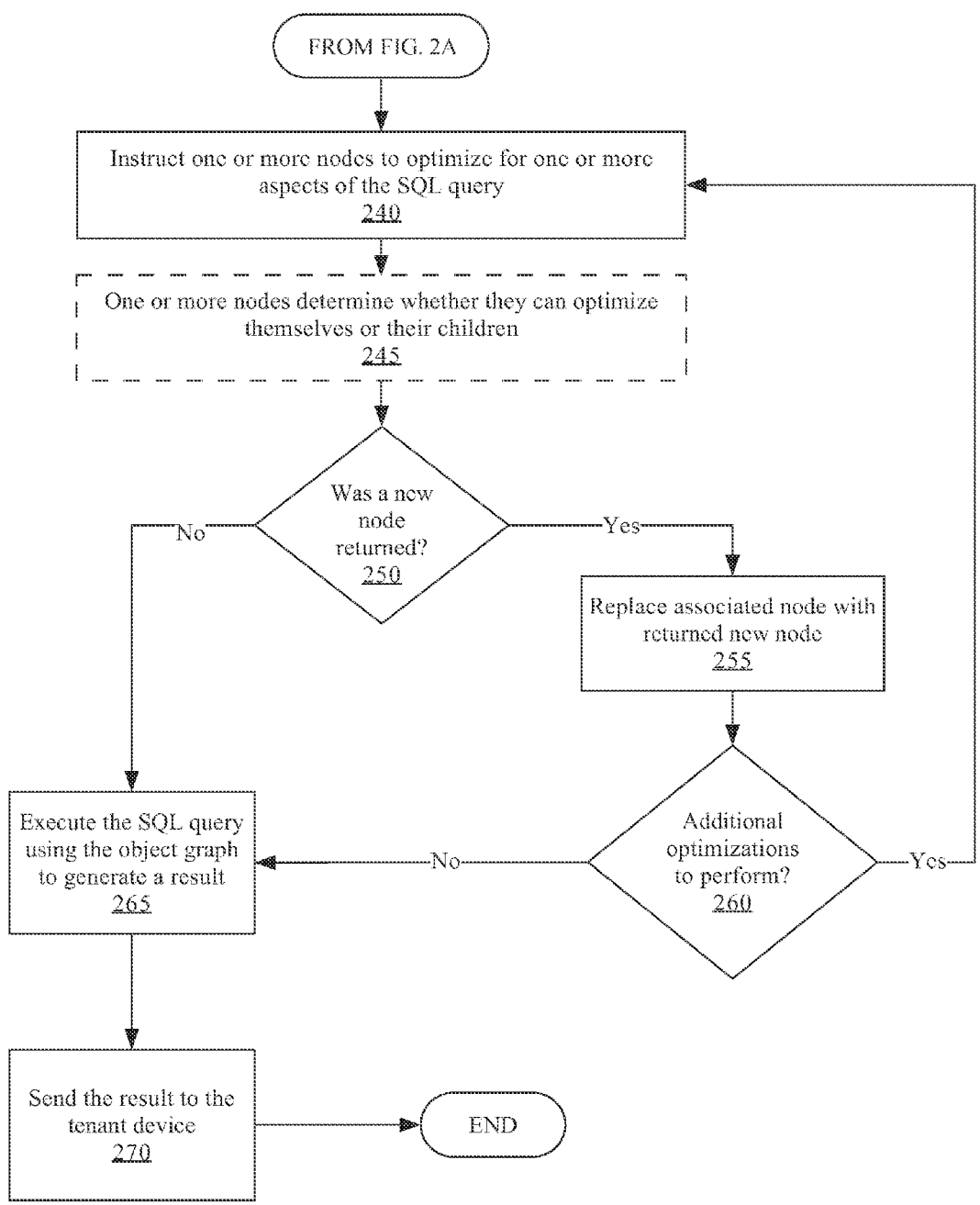

FIGS. 2A and 2B show example flowcharts of a method for transient virtual single tenancy. Although the steps in FIGS. 2A and 2B are shown in an order, the steps of FIGS. 2A and 2B may be performed in any order, and are not limited to the orders shown in FIGS. 2A and 2B. Additionally, some steps may be optional, may be performed multiple times, and/or may be performed by different components.

In step 200, virtual objects are identified to a tenant device. The virtual objects may be identified in response to a request from the tenant device, and/or provided in response to a different action by the tenant device, such as providing login credentials. Specifically, the virtual objects identified may be tables in a virtual database representing data accessible to the tenant device.

In step 205, a determination is made whether a new function has been received from a tenant device. In one embodiment, step 205 is optional, as one or more functions may be pre-existing. Additionally, step 205 may be performed at any time, and need not be performed in the order shown in FIG. 2. In one embodiment, the determination may be made in any manner. If a new function has not been received, the method proceeds to step 225. Alternatively, if a new function has been received, the method proceeds to step 210.

In step 210, a determination is made whether approval has been received for the new function. The approval may be received in any manner. In one embodiment, an application or module may perform various checks to ensure that the new function meets certain requirements, such as security, read/write privileges, use of resources, etc. Alternatively, an administrator or other user may review the new function and indicate their approval or disapproval through an interface or other suitable means. If approval for the new function has not been received, the method proceeds to step 220. Alternatively, if the new function has received approval, the method proceeds to step 215.

In step 220 the function is rejected. The function may be rejected in any manner now known or later developed. Specifically, the tenant who created the function may be notified why the function is rejected. Alternatively, no information is provided regarding the reasons for rejection. After step 220, the method may return to step 205 as shown in FIG. 2. Alternatively, the method may end.

Returning to the other branch from step 210, in step 215, the new function is added as accessible by the tenant(s). The new function may be added to a list, or other grouping, of functions accessible by the tenant(s). In one embodiment, the newly added function is accessible only to the tenant who created the function. Alternatively, the newly added function may be accessible to all tenants, a selected subset of tenants, or any other combination of tenants. The newly added function may perform any type of action or actions.

In step 225, an SQL query to access a virtual object is received from a tenant device. The SQL query may be received in any suitable manner. For example, the SQL query may be received through a database connector, such as ODBC, JDBC, or other database connector. In one embodiment, the database connector is implemented using a RESTful framework, to ensure the reliability and scalability of the database connector. Further, the database connector may use HTTP to communicate with the database or other resource(s). The SQL query may take any form. For example, the SQL query may be initially generated by a spreadsheet application, or any other application. In one embodiment, the SQL query is for the XSQL implementation of SQL, created by Xactly Corporation, San Jose, Calif. Alternatively, the SQL query may be for any other implementation of SQL.

In step 230 the virtual object is replaced with a function. The virtual object may be linked to the function by a text command language. The virtual object may be any virtual object that the tenant wants to access. In one embodiment, the function includes any needed programming to access, modify, and/or return the requested data—no further information, such as metadata, is required by the function to execute. "Metadata," in this context, refers to data describing specifically what is to be accessed in the target database or storage device. This is in contrast to a "standard" SQL implementation, which requires metadata to successfully execute the query. The XSQL query is able to be executed without metadata because all access to data is handled by the function(s). Further, the XSQL engine is not required to include programming to store and/or access data, as the function(s) implement any such programming. Instead, the functions dynamically define the data storage targets of a query.

The function may be a function created by the entity that created and/or manages the application and/or database that the tenant is accessing. Alternatively, the function may have been created by the tenant themselves, another tenant, or any other suitable entity.

In step 235, an object graph is generated with a plurality of nodes. An object graph may contain any number of nodes, from 1 to thousands, dependent upon the length and complexity of the associated SQL query. In one embodiment, each node of the object graph represents a Java class, function, or other suitable element. Any give node may have any number of child nodes, and the object graph can take any shape. The object graph may be created in any suitable manner using, for example, a parser. In one embodiment, the initial object graph is canonical. In other words, the object graph is predictable and reproducible for a given set of SQL commands. Further, the initial object graph may not be optimized. After step 235, the flowchart continues on to FIG. 2B.

Continuing the flowchart on FIG. 2B, in step 240, one or more nodes of the object graph are instructed to optimize for one or more aspects of the SQL query. Specifically, the aspect for which the nodes are asked to optimize for may be any suitable SQL command including, but not limited to: select, predicate, join, aggregate, sort, etc. The nodes may be instructed and/or asked to optimize in any suitable manner. Optionally, rather than asking the nodes to optimize themselves or in addition to asking the nodes to optimize themselves, an optimizer, or other suitable component, may examine the object graph and make improvements in any suitable manner.

In step 245, one or more nodes determine whether they can optimize themselves or their children. As indicated by the dotted lines, step 245 is performed by the functions themselves, rather than by some outside process. If a given function is able to optimize itself or any associated child nodes, the function returns a new node. The new node contains the optimization. Specifically, the new node may contain a new class (e.g., class A instead of class B), a new function (e.g., g(x) instead of f(x)), the same function and/or class with added data (e.g., f(x,y) instead of f(x)), etc. The new node or nodes returned may replace a single node or multiple nodes in the object graph. For example, consider the query: select * from f(x) join f(y), as shown in FIG. 1B. The three nodes representing the join, f(x), and f(y) are able to be combined into a single node representing f(x,y). In one embodiment, a given node may ask associated child nodes to optimize themselves. If a given node is unable to optimize itself or any associated child nodes below, then no new node is returned.

In step 250, a determination is made whether a new node was returned. The determination may be made in any manner. If a new node was not returned, the method proceeds to step 265. If a new node was returned, the method proceeds to step 255.

In step 255, the node associated with the newly returned node is replaced by the new node. The new node may be placed in the same spot in the object graph as the original, un-optimized node. Alternatively, the new node may require further changes in the object graph, such as deleting and replacing multiple nodes with the new node. The replacement may be performed in any suitable manner.

In step 260, a determination is made whether there are further optimizations to perform. In one embodiment, the determination may be made based on the size of the object graph, whether the nodes have been instructed to optimize for each aspect/command present in the SQL query, and/or for any other suitable reason. If there are further optimizations to perform, the method returns to step 240. If there are no further optimizations to perform, the method proceeds to step 265.

In step 265, the SQL query is executed using the object graph to generate a result. Specifically, the object graph that is executed is in as optimized a state as the present method can achieve. In one embodiment, the original object graph may be unable to be improved and, therefore, the original object graph is executed. Alternatively, optimizations may have been made, and thus an optimized graph is executed. During execution, functions may access data from any source to return the result including, but not limited to: one or more databases, the internet, and/or any other location accessible by the function. Additionally, functions may execute in any manner now known or later developed. In one embodiment, the data returned by the functions is in tabular form. Alternatively, the data returned by the functions may take any other form.

In step 270, the result is sent to tenant device. The result may be sent to the tenant device in any manner. Optionally, before the result is sent to the tenant device, integrity or other checks may be performed on the result to ensure that the result is in the expected format and/or contains the expected data.

Example Use Case

Figure 3A:
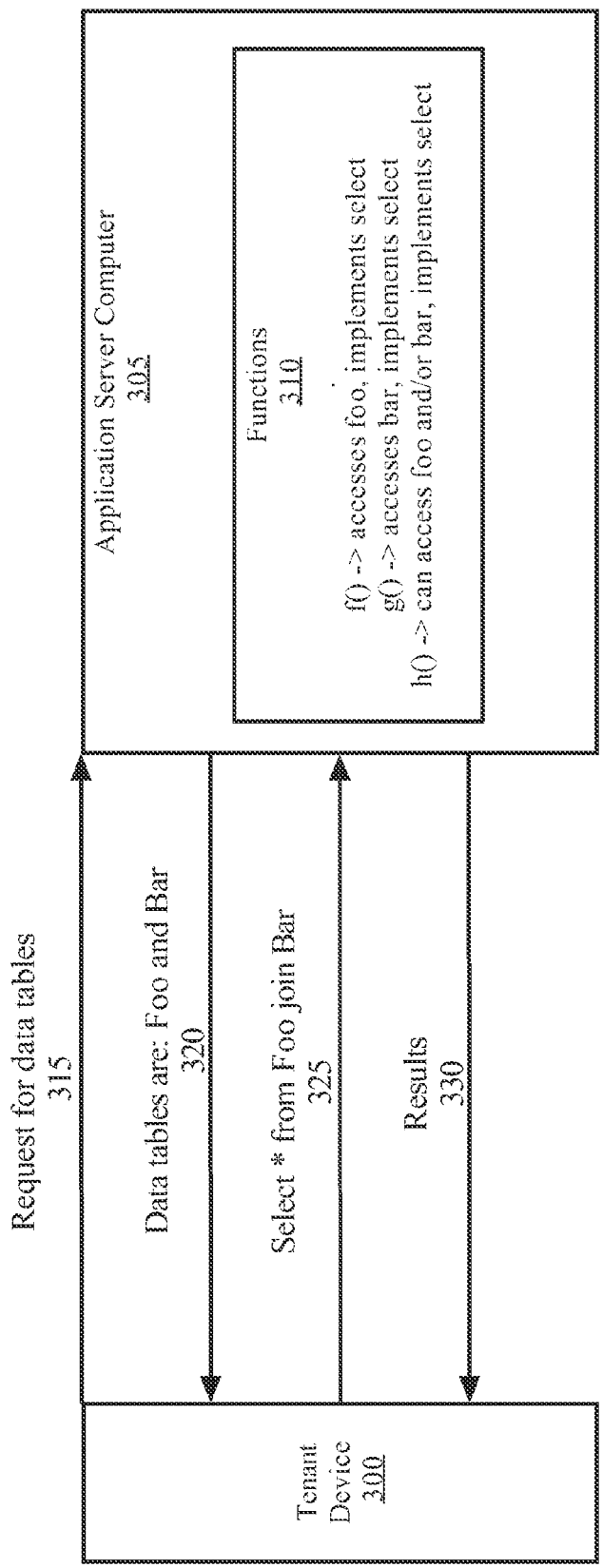
FIGS. 3A and 3B show example use cases in accordance with an embodiment of the invention.
Figure 3B:
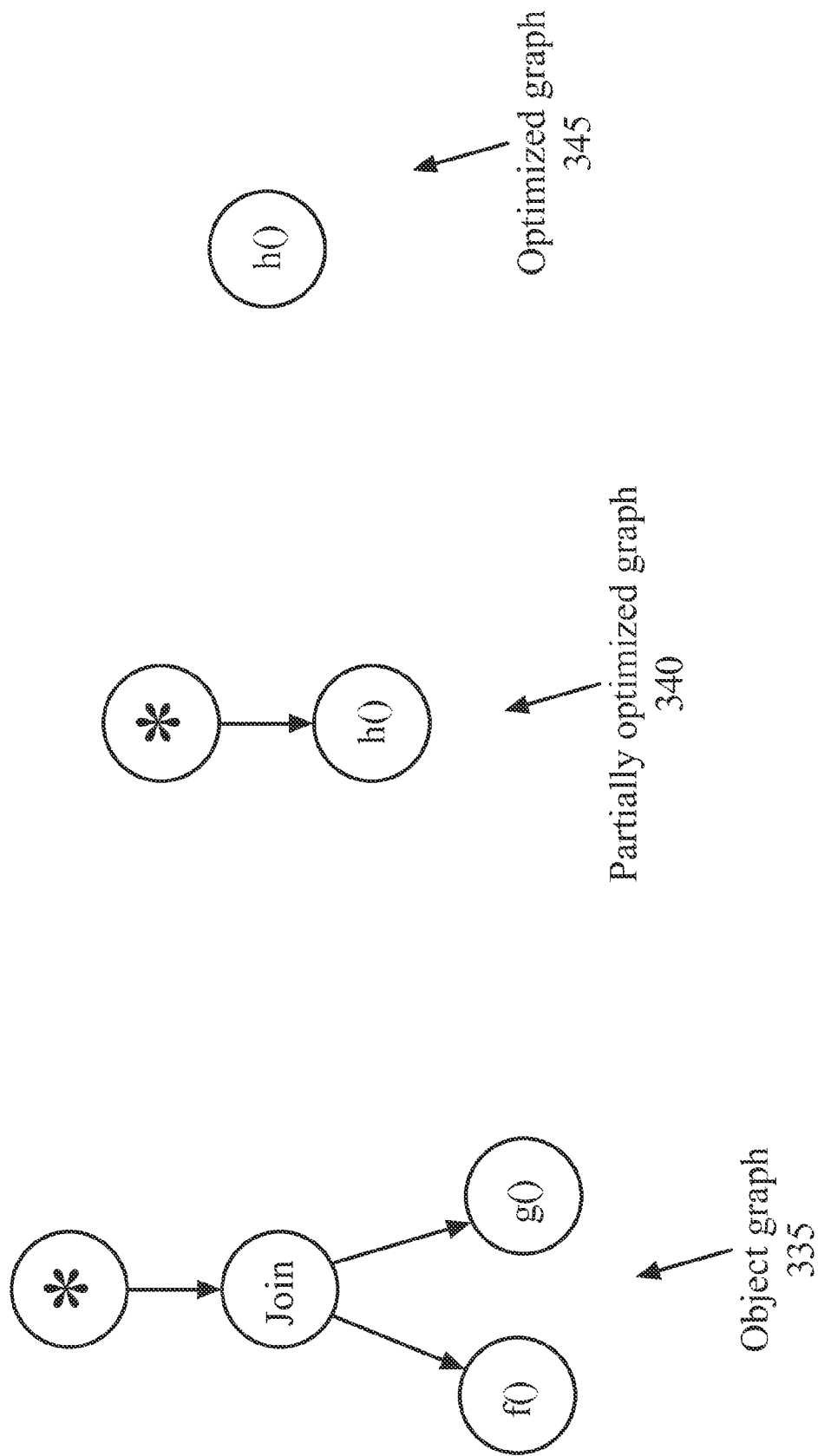

FIGS. 3A and 3B show a specific use case. Specifically, FIG. 3A shows a system with tenant device 300, and application server computer 305. Tenant device 300 in this example is a computer used by an employee of the tenant that recently subscribed to a multitenant online database service to help ensure that the tenant is properly compensating his or her employees. Application server computer 305 is the provider of the multitenant online database service. The service implements programming for in-depth analysis of the tenant's data, as well as access to benchmarking data about other tenants. The multitenant service requires compensation data to be in format "X." The tenant's data, however, is in format "A." The tenant agrees to allow the multitenant service provider to perform ETL to convert the compensation data from format "A" to "X," and store the data in the production database.

Application server computer 305 includes functions 310. Functions 310 are functions used to access client data. Specifically, function f( ) accesses the resource "foo" and implements a selection interface, function g( ) accesses the resource "bar" and implements a selection interface, and function h( ) accesses the resource "foo" and/or "bar" and implements a selection interface.

During the ETL processes, the tenant or a tenant program wishes to access the tenant's data. Thus, a request for data tables 315 is sent to the application server computer 305. The application server computer 305 responds that the tenant's data is located on tables foo and bar 320, where both foo and bar are virtual objects, meaning that a table foo or table bar is not actually in the database.

Next, to access tenant data in table foo, the tenant's requesting program sends the SQL query 325:

select * from foo join bar to the application server computer 305. In response, the application server computer 305 transforms the SQL query into an XSQL query by replacing foo with f( ) and bar with g( ) to yield:

select * from f( ) join g( )

Before results 330 are sent to the tenant device 300, object graph 335 of FIG. 3B is generated. Object graph 335 is a representation of the XSQL query, and is not yet in an optimized state. Thus, the XSQL engine asks the nodes of object graph to optimize, and because there is a third function (e.g., function h( )) that is capable of selecting from both virtual table foo (now f( )) and virtual table bar (now (g( )), the nodes return a new node that is simply h( ). Replacing the join, f( ), and g( ), nodes with the h( ) node, results in partially optimized graph 340. A final optimization is performed by removing the select *, as it is redundant, and the resulting optimized graph 345 is generated. Optimized graph 345 is then executed, and all data from the shared database system that contains this tenant's data is selected and the result 330 of FIG. 3A is generated. In the shared multi-tenant database system, the tenant's data actually is interleaved with data of many other tenants. In part, the function h( ) may select data from the shared database using a tag that identifies the requesting tenant. Subsequently, result 330 is sent to tenant device 300.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
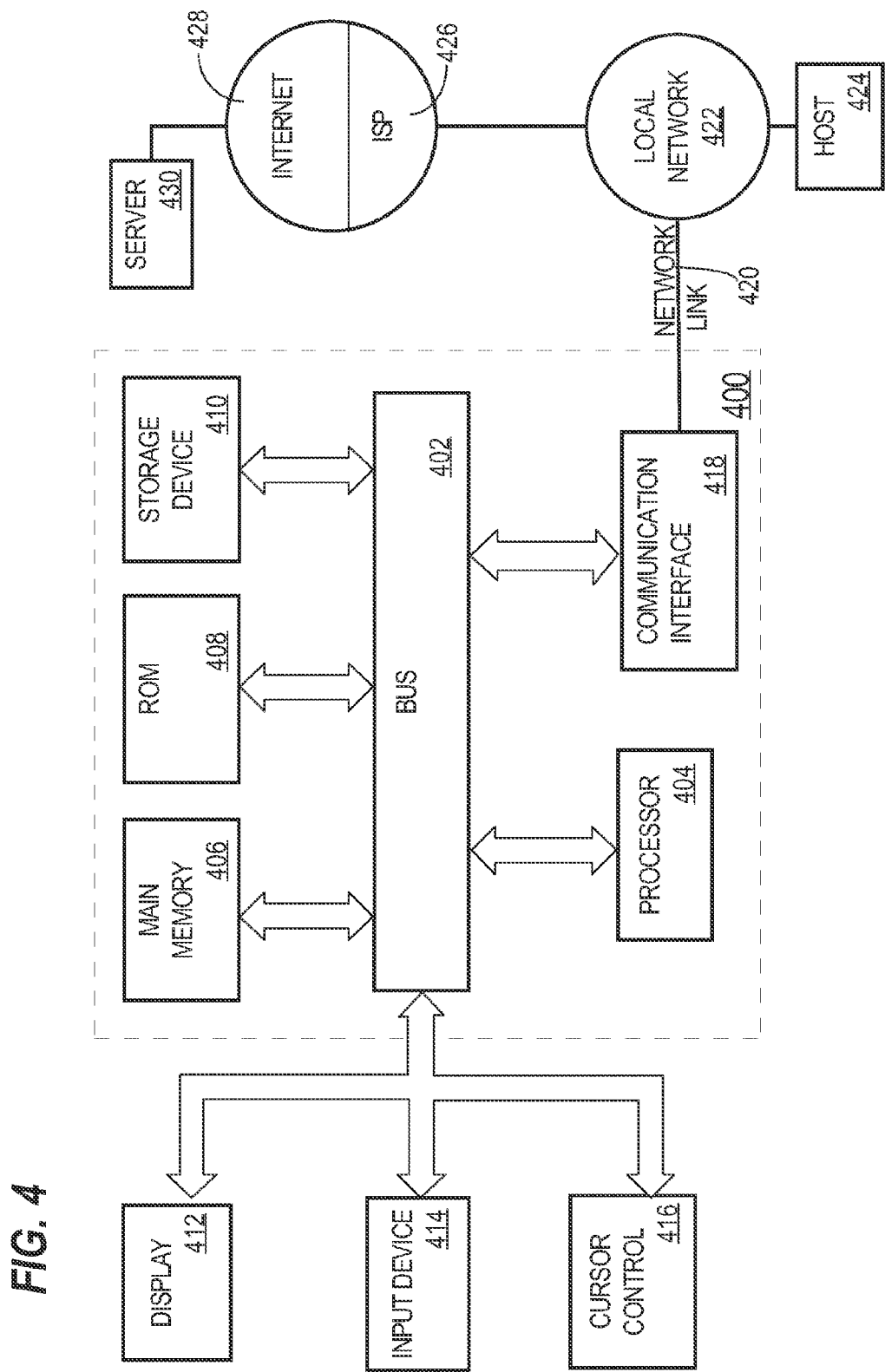
FIG. 4 shows a block diagram of a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled to bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A data processing method comprising:

using an application server computer of an application service provider (ASP), establishing a computerized shared multi-tenant system in which tenant data that is associated with a plurality of different tenants of the ASP is stored together in a real shared datastore system, and in which data records in the real shared data store system comprise tenant identifiers that identify the tenants to which the data records pertain;

receiving, by the application server computer, function programming code representing a function from the tenant computing device;

using the application server computer, initiating an approval workflow within the ASP that identifies the function programming code and one or more reviewers and/or approvers, and communicating one or more request messages that are configured to request review and/or approval of the function to end-user computers associated with the one or more reviewers and/or approvers;

using the application server computer, receiving an approval message specifying approval of the function;

using the application server computer, providing to a tenant computing device a plurality of identifiers that identify a corresponding plurality of virtual objects, wherein each of the virtual objects represents a data entity that is stored in the real shared data store system;

using the application server computer, receiving a SQL query from the tenant computing device that specifies a data operation on a first virtual object of the plurality of virtual objects;

using the application server computer, rewriting the SQL query by dynamically replacing the first virtual object with an identifier of the function that is selected from among a plurality of functions and that is programmed to access only data records that are associated with a tenant corresponding to the tenant computing device, wherein the function implements an interface needed by the SQL query;

using the application server computer, executing the function and the rewritten query without explicit metadata to generate a result set;

using the application server computer, sending the result set to the tenant computing device;

wherein the method is performed using one or more computing devices.

2. The data processing method of claim 1 wherein the function comprises a JAVA method that selectively implements one or more of a plurality of interfaces.

3. The data processing method of claim 1 wherein the function comprises a JAVA method that selectively implements one or more of a plurality of federation interfaces.

4. The data processing method of claim 3, wherein the JAVA method implements the federation interfaces comprising one or more of a selection interface, a joining interface, a filtering interface, an aggregation interface, a post aggregation filtering interface, a distinction interface, and a limit interface.

5. The data processing method of claim 1, further comprising receiving the SQL query from the tenant computing device using a RESTful database connector.

6. The data processing method of claim 5, wherein the RESTful database connector connects to the computerized shared multi-tenant system through a load balancer using Hypertext Transfer Protocol (HTTP).

7. The data processing method of claim 1, further comprising:
generating an object graph comprising a plurality of nodes;
optimizing the object graph by instructing a first node of the plurality of nodes to optimize the first node for an aspect of the SQL query;
returning, by the first node, a second node in response to the first node optimizing for the aspect, wherein the second node replaces the first node in the object graph.

8. A computing system comprising:
an application server computer of an application service provider (ASP) that establishes a computerized shared multi-tenant system in which tenant data that is associated with a plurality of different tenants of the ASP is stored together in a real shared data store system, and in which data records in the real shared data store system comprise tenant identifiers that identify the tenants to which the data records pertain;
a tenant computing device coupled by a network to the application server computer;
wherein the application server computer comprises a processor and a memory storing instructions, which, when executed by the processor, cause the application server computer to perform:
receiving function programming code representing a function from the tenant computing device;
initiating an approval workflow within the ASP that identifies the function programming code and one or more reviewers and/or approvers, and communicating one or more request messages that are configured to request review and/or approval of the new function to end-user computers associated with the one or more reviewers and/or approvers;
receiving an approval message specifying approval of the function;
providing to the tenant computing device a plurality of identifiers that identify a corresponding plurality of virtual objects, wherein each of the virtual objects represents a data entity that is stored in the real shared data store system;
receiving a SQL query from the tenant computing device that specifies a data operation on a first virtual object of the plurality of virtual objects;
rewriting the SQL query by dynamically replacing the first virtual object with an identifier of the function that is selected from among a plurality of functions and that is programmed to access only data records that are associated with a tenant corresponding to the tenant computing device, wherein the function implements an interface needed by the SQL query;
executing the function and the rewritten query without explicit metadata to generate a result set;
sending the result set to the tenant computing device.

9. The system of claim 8 wherein the function comprises a JAVA method that selectively implements one or more of a plurality of interfaces.

10. The system of claim 8 wherein the function comprises a JAVA method that selectively implements one or more of a plurality of federation interfaces.

11. The system of claim 10, wherein the JAVA method implements the federation interfaces comprising one or more of a selection interface, a joining interface, a filtering interface, an aggregation interface, a post aggregation filtering interface, a distinction interface, and a limit interface.

12. The system of claim 8, the instructions of the application server computer, when executed, further perform receiving the SQL query from the tenant computing device using a RESTful database connector.

13. The system of claim 12, wherein the RESTful database connector connects to the computerized shared multi-tenant system through a load balancer using Hypertext Transfer Protocol (HTTP).

14. The system of claim 8, the instructions of the application server computer, when executed, further perform:
generating an object graph comprising a plurality of nodes;
optimizing the object graph by instructing a first node of the plurality of nodes to optimize the first node for an aspect of the SQL query;
returning, by the first node, a second node in response to the first node optimizing for the aspect, wherein the second node replaces the first node in the object graph.

* * * * *